3,470,297
CORONARY DILATING COMPOSITIONS AND
THEIR ADMINISTRATION
Friedrich Bossert, Wuppertal-Elberfeld, and Wulf Vater, Opladen, Germany, assignors to Farbenfabriken Bayer Aktiengesellschaft, Leverkusen, Germany, a corporation of Germany
No Drawing. Filed Nov. 1, 1966, Ser. No. 591,082
Claims priority, application Germany, Nov. 10, 1965, F 47,633
Int. Cl. A61k 27/00; C07d 57/00
U.S. Cl. 424—263    13 Claims

ABSTRACT OF THE DISCLOSURE

Coronary insufficiency and angina pectoris can be treated by using a composition which consists essentially of from 5 to 50 mg. of a dihydrodipyridyl derivative or a non-toxic pharmaceutically acceptable salt thereof, said dihydrodipyridyl derivative having the formula:

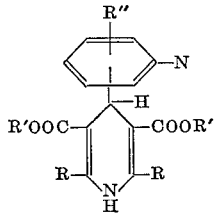

wherein:

R is hydrogen or alkyl of 1 to 3 carbon atoms,
R' is alkyl of 1 to 4 carbon atoms, and
R" is hydrogen, lower alkyl or lower alkoxy, in combination with a pharmaceutically acceptable non-toxic inert carrier.

---

The present invention relates to compositions in which the active ingredient is a dihydrodipyridyl derivative or a non-toxic pharmaceutically acceptable acid salt thereof useful for the treatment of coronary insufficiency and angina pectoris and to the administration of such a composition particularly in the form of a water-soluble salt of a dihydrodipyridyl derivative by the intravenous and peroral routes to obtain long lasting coronary dilation. Such composition contains a therapeutically effective amount of active ingredient in the range of 5 to 50 mg. per dose depending upon the specific derivative involved and its dosage form.

Diseases of the circulatory system and especially those which relate to the coronaries of the heart have over the years become more and more important and have occurred more frequently and as a result there have been many efforts to find effective compounds which can be used for combating these conditions. Commercially available preparations such as dipyramidol and carbochromes seem to give somewhat favorable results in experiments in animals when administered intravenously and therefore were thought to be of possible therapeutic use in humans, but unfortunately these substances have not shown consistent or positive clinical success in coronary insufficiency and particularly in painful and serious angina pectoris. In view of the same it has still been generally considered that nitrites had to be relied upon.

It has now been found that when certain dihydrodipyridyl derivatives or their non-toxic pharmaceutically acceptable salts with organic and inorganic acids are put up into dosage form with the usual carriers, vehicles or excipients, very favorable long lasting coronary dilation can be obtained both by intravenous and peroral administration with results far superior to all hitherto known commercial products. The activity of these new derivatives and salts can, if desired, be used simultaneously with nitrites, but such is not essential.

The dihydrodipyridyl derivatives have the formula:

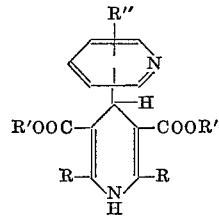

in which:

R is hydrogen or alkyl of 1 to 3 carbon atoms,
R' is alkyl of 1 to 4 carbon atoms, and
R" is hydrogen, lower alkyl or lower alkoxy.

These derivatives are prepared by reacting a pyridine aldehyde which may be substituted by lower alkyl or lower alkoxy groups with acyl fatty acid esters of the formula:

R—CO—CH$_2$—COOR' in which:

R is hydrogen or an alkyl group of 1 to 3 carbon atoms and
R' is an alkyl group of 1 to 4 carbon atoms, and with ammonia in an organic solvent such as a lower aliphatic alcohol like methanol or ethanol.

The following non-limitative examples illustrate a number of dihydrodipyridyl derivatives usable in the present invention together with procedure for preparing the same.

EXAMPLE 1

107 g. of pyridine-4-aldehyde, 258 ccm. of acetoacetic acid ethyl ester, 200 ccm. of methanol and 100 ccm. of concentrated ammonia are heated to the boil for 5 to 6 hours and cooled; there are obtained 200 g. of yellow crystals of 4',4'-(3,5-dicarbethoxy-2,6-dimethyl-1,4-dihydro)-dipyridine of melting point 195° C. (alcohol).

EXAMPLE 2

After 107 g. of pyridine-2-aldehyde, 258 ccm. of acetoacetic acid ethyl ester, 200 ccm. of methanol and 100 ccm. of ammonia have been heated for 5 hours, cooling and filtering off with suction are effected. There are obtained 230 g. of pale yellow crystals of 2',4-(3,5-dicarbethoxy-2,6-dimethyl-1,4-dihydro)-dipyridine of melting point 198° C. (alcohol); HCl salt melting point 205° C. (with decomposition). The 3',4-(3,5-dicarbethoxy-2,6-dimethyl-1,4-dihydro)-dipyridine prepared in the same manner from pyridine-3-aldehyde melts at 194° C.

EXAMPLE 3

107 g. of pyridine-4-aldehyde, 232 g. of acetoacetic acid methyl ester, 200 ccm. of methanol and 100 ccm. of ammonia are boiled overnight and cooled; 170 g. of pale yellow crystals of 4',4-(3,5-dicarbmethoxy-2,6-dimethyl-1,4-dihydro)-dipyridine of melting point 197° C. are obtained. The 2',4-(3,5-dicarbmethoxy-2,6-dimethyl-1,4-dihydro)-dipyridine obtained from pyridine-2-aldehyde melts at 236 to 238° C.

EXAMPLE 4

After 25.5 g. of pyridine-4-aldehyde, 50 ccm. of methanol, 25 ccm. of ammonia and 80 ccm. of acetoacetic acid tert.-butyl ester have been heated for several hours, pale yellow crystals of 4',4-3,5-dicarbutoxy-tert.-2,6-dimethyl-1,4-dihydro)-dipyridine of melting point 188 to 190° C. (HCl salt melting point 215° C.) are obtained.

With pyridine-2-aldehyde a compound of melting point 223 to 225° C. is obtained.

EXAMPLE 5

10 ccm. of pyridine-3-aldehyde, 32 g. of isobutyrylacetic ester, 10 ccm. of ammonia and 25 ccm. of methanol are heated to the boil overnight and, after cooling and filtering off with suction, white crystals of 3′,4-(3,5-dicarbethoxy-2,6-diisopropyl - 1,4 - dihydro)-dipyridine of melting point 125° C. are obtained.

EXAMPLE 6

24.2 g. of 6-methylpyridine-2-aldehyde, 20 ccm. of ammonia, 52 ccm. of acetoacetic ester and 50 ccm. of methanol are heated to the boil for 2 to 3 hours. This is followed by filtering off with suction, washing with methanol and recrystallization from alcohol.

Yellow crystals of 6′-methyl-2′,4-(3,5-dicarbethoxy-2,6-dimethyl-1,4-dihydro)-dipyridine of melting point 197 to 199° C. are obtained.

The dihydrodipyridyl derivatives, preferably in the form of their non-toxic pharmaceutically acceptable water-soluble salts with organic and inorganic acids, are made up into compositions for peroral and intravenous administration. For peroral use, compositions are prepared in the form of capsules, pills, tablets, powders and drops and for intravenous use, injectable solutions in distilled water are prepared and sealed into ampules. The compositions are in unit dosage form containing, aside from the carrier, vehicle or excipient, 5 to 50 mg. as the active ingredient of a dihydrodipyridyl derivative according to the structural formula given above or in any of the specific compounds set forth in the examples. Since the acid salts are soluble in water, they are generally preferred especially for the injectable solutions and in the case of peroral preparations, they are combined in a manner per se known with a suitable pharmaceutical carrier or vehicle of conventional nature. Tests have been carried out on compositions containing the compound 2′,4-(3,5-dicarbethoxy - 2,6 - dimethyl-1,4-dihydro)-dipyridine monohydrochloride (hereinafter referred to as Substance I) produced according to Example 2, but the pharmacological examination of the other compounds falling within the structural formula given above show that all the compounds here involved have the stated utility, although this differs a little from compound to compound. Substance I, upon peroral administration, shows a low toxicity. In mice the $LD_{50}$ is >10,000 mg./kg. and in rats the $LD_{50}$ is >3,000 mg./kg. At a dosage of 500 mg./kg., dogs vomit the substance, but there are no other adverse side effects. Upon intravenous administration, the $LD_{50}$ in mice is 58 mg./kg. and in rats is 37 mg./kg. Dogs survive intravenous administration of 8 mg./kg. Excessive dosages in animals lead to nonspecific toxic conditions which, if the dosage is large enough, results in anoxemic cramps and death after dyspnoea. In dogs narcotized with Phanodorm, coronary blood flow increases depending upon the dosage administered and this is in the range of 0.1 to 2 mg./kg. intravenously and there is a simultaneous increase in coronary-venous oxygen saturation at 1 mg./kg. dosage which lasts for several hours on a heart cathetered dog.

Experiments with Substance I were carried out on 11 dogs with the result that oxygen saturation of the blood incarases from a starting value of 38% up to a maximum of 68% and even after 3 hours, the increase was still 54%. Examination of the treated dogs showed a moderate amount of coronary widening and with an increase of coronary blood flow the oxygen consumption of the heart decreased to about one-half. This is surprising since narcosis causes a substantial decrease in heart frequency. Simultaneously with the strongly increased coronary blood flow, an increased blood flow to the skin and muscles was noted as manifested by a drop in blood pressure and in turn reducing the load on the heart. This noticeable peripheral decrease in blood flow resistance has as a consequence a decrease in oxygen consumption. In this respect Substance I is similar to the well known and clinically effective nitrites which also cause a noticeable decrease in oxygen consumption. The effect of Substance I on the blood pressure (average of 5 dogs) was found to be:

|  | Mm. Hg |
|---|---|
| At the beginning _____mm. Hg__ | 127/102 |
| After: | |
| 10 minutes _____mg. Hg__ | 108/79 |
| 60 minutes _____mg. Hg__ | 121/95 |
| 90 minutes _____mg. Hg__ | 127/101 |

In unnarcotized (awake) dogs, the decrease in blood pressure is less. In peroral administration to heart cathetered dogs a definite and certain effect is noticeable for a number of hours after 10 and 20 mg./kg. intake of Substance I and this effect parallels the blood picture, but of practical significance, there is a restraining or dampening effect on the excitability of the heart. As far as is known, the pharmacological action of Substance I is on the smooth vascular system and there is an effect on the central or vegetative-central nervous system which has now been demonstrated.

A suitable ampuled solution for intravenous use has the following formulation:

| Substance I 100% _____ | 2.777 g. (=2.5 g. base). |
|---|---|
| Natriumchloride DAB 6 _____ | 8.100 g. |
| n/10 hydrochloric acid to pH 3.0 ca. _____ | 15.000 ml. |
| Redistilled water q.s. to 1.000 liter. | |

The above solution is sufficient to fill 500 ampules, each of which contains 5 mg. of Substance I. The new compositions can be used prophylactically as well as therapeutically for hypertonic coronary insufficiency and for attacks of angina pectoris. For peroral administration a single dose contains 50 mg. of active ingredient and for intravenous use 5 mg. Depending upon the severity of the condition being treated, 1 to 5 individual doses are administered daily.

What is claimed is:

1. A composition for the treatment of coronary insufficiency and angina pectoris which consists essentially of a pharmaceutically acceptable non-toxic inert carrier in which is incorporated as the active agent from 5 to 50 mg. of a dihydrodipyridyl derivative or a non-toxic pharmaceutically acceptable acid salt thereof, said dihydrodipyridyl derivative having the formula:

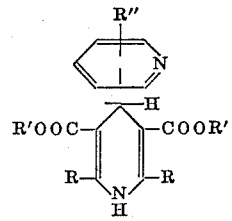

wherein:
R is hydrogen or alkyl of 1 to 3 carbon atoms,
R′ is alkyl of 1 to 4 carbon atoms, and
R″ is hydrogen, lower alkyl or lower alkoxy.

2. A composition according to claim 1 in which the dihydrodipyridyl derivative is 4′,4′-(3,5-dicarbethoxy-2,6-dimethyl-1,4-dihydro)-dipyridine.

3. A composition according to claim 1 in which the dihydrodipyridyl derivative is 2′,4-(3,5-dicarbethoxy-2,6-dimethyl-1,4-dihydro)-dipyridine.

4. A composition according to claim 1 in which the dihydrodipyridyl derivative is 2′,4-(3,5-dicarbmethoxy-2,6-dimethyl-1,4-dihydro)-dipyridine.

5. A composition according to claim 1 in which the dihydrodipyridyl derivative is 4',4-(3,5-dicarbutoxy-tert.-2,6-dimethyl-1,4-dihydro)-dipyridine.

6. A composition according to claim 1 in which the dihydrodipyridyl derivative is 3',4-(3,5-dicarbethoxy-2,6-diisopropyl-1,4-dihydro)-dipyridine.

7. A composition according to claim 1 in which the dihydrodipyridyl derivative is 6'-methyl-2',4-(3,5 - dicarbethoxy-2,6-dimethyl-1,4-dihydro)-dipyridine.

8. A method of treating coronary insufficiency and angina pectoris which comprises orally administering to animals and humans in need thereof a composition of claim 1.

9. A method of treating coronary insufficiency and angina pectoris which comprises orally administering to animals and humans in need thereof a composition of claim 1 in 1 to 5 single doses per day.

10. A method of treating coronary insufficiency and angina pectoris which comprises intravenously administering to animals and humans in need thereof a composition of claim 1.

11. A method of treating coronary insufficiency and angina pectoris which comprises intravenously administering to animals and humans in need thereof a composition of claim 1 in 1 to 5 single doses per day.

12. A composition according to claim 1 in which the dihydrodipyridyl derivative is 3',4-(3,5-dicarbethoxy-2,6-dimethyl-1,4-dihydro)-dipyridine.

13. A composition according to claim 1 in which the dihydrodipyridyl derivative is 4',4-(3,5-dicarbmethoxy-2,6-dimethyl-1,4-dihydro)-dipyridine.

No references cited.

RICHARD L. HUFF, Primary Examiner

U.S. Cl. X.R.

260—295.5